May 6, 1969     K. WERNER     3,442,576

OPTICAL INSTRUMENT WITH MOVABLE LENS HOLDER

Filed June 6, 1966

Inventor:
Kurt Werner
By:
Karl F. Ross
Attorney

United States Patent Office 3,442,576
Patented May 6, 1969

3,442,576
OPTICAL INSTRUMENT WITH MOVABLE LENS HOLDER
Kurt Werner, Munster-Sarmsheim, Germany, assignor to Fa. Jos. Schneider & Co., Bad Kreuznach, Rhineland, Germany, a corporation of Germany
Filed June 6, 1966, Ser. No. 555,560
Claims priority, application Germany, June 10, 1965, Sch 37,204
Int. Cl. G02b 7/10
U.S. Cl. 350—255         7 Claims

ABSTRACT OF THE DISCLOSURE

A tubular lens holder and a tubular extension of a camera housing, coaxially nested for relative sliding motion, are provided with normally interengaging coupling elements in the form of a rack and a spirally grooved disk engaging the rack teeth; the disk is mounted on a retractable stem, lodged in a handle rigid with the outer tube, which extends generally perpendicularly to the tube axis and carries a milled knob to permit rotation of the stem as well as disengagement of the disk from the rack upon a longitudinal outward shift of the stem.

---

My present invention relates to an optical instrument, such as a photographic or cinematographic camera, in which a lens holder is movable with reference to a housing along the optical axis of its lens system.

Particularly in the case of cameras having objectives of large focal lengths, the objective (or part thereof) must be displaceable within a relatively wide range for focusing purposes. It is therefore desirable in such systems to provide for both coarse and fine adjustment, the former for a rapid presetting and the latter for an accurate focusing upon the selected object.

My present invention aims at the provision of mechanism for the realization of such dual adjustment by simple and reliable means.

This object is attained, pursuant to the present invention, by the provision of two relatively slidable and interengaging support members, such as a cylinder and a rod traversing same (preferably with interposition of ball bearings or similar antifriction means), one of these members being secured to the camera housing while the other is firmly connected with the lens holder. A handle is rigid with one of these support members, preferably the one attached to the lens holder, and carries a first coupling element which releasably engages a second coupling element mounted on the other support member whereby the two members, and therefore the lens holder and the housing, can be linearly displaced relatively to each other upon movement of the first coupling element by an external force. Such movement may be imparted, e.g., manually, to that first coupling element by suitable actuating means on the handle, advantageously a milled knob partly projecting from the handle and secured to a stem which is rigid with the first clutch element. This milled knob, or its equivalent, may also serve as the means for disengaging the two coupling elements by a displacement of its stem in longitudinal direction, against the force of a restoring spring which may be socketed in the handle.

In accordance with a more particular feature of my invention, the two coupling elements are a disk with a spirally grooved surface on the aforementioned stem and a rack normally in mesh with that surface.

The above and other features of my invention will become more fully apparent from the following detailed description of a representative embodiment, reference being made to the accompanying drawing in which.

Figure 1:
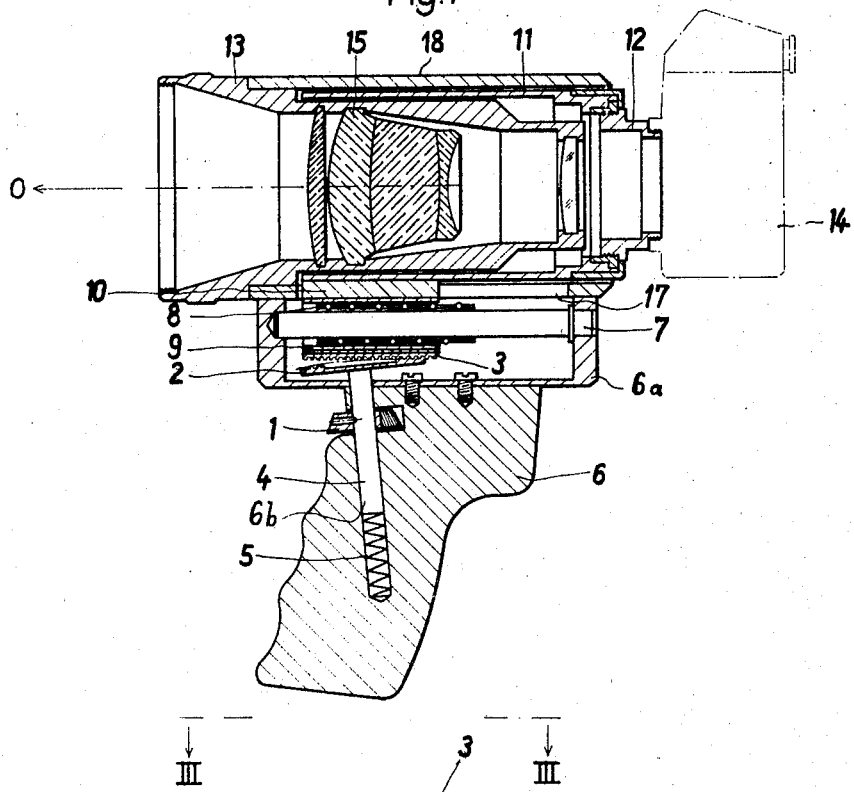
FIG. 1 is a longitudinal sectional view of a photographic camera equipped with a focusing mechanism according to the invention.
Figure 2:
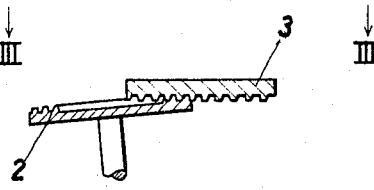
FIG. 2 is a detail view representing the coupling elements of the mechanism in longitudinal section.
Figure 3:
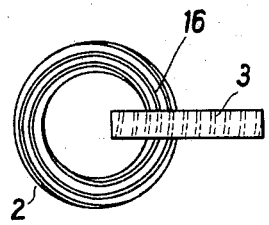
FIG. 3 is a top plan view of the elements shown in FIG. 2.

The photographic instrument shown in FIG. 1 comprises a lens holder 13 and a camera housing 14 which are relatively displaceable in the direction of the optical axis O of an objective system 15 mounted in the holder. A handle 6 has a recessed head 6a spanned by a rod 7 which extends parallel to the axis O. Surrounding the rod 7, with interposition of a ball-bearing cage 8, is a guide cylinder 9 rigidly secured to a tongue 10 sliding in a slot 17 of a sleeve 18 which is rigid with lens holder 13 and head 6a. Tongue 10 in its turn is connected with a tube 11 which is slidably received in sleeve 18 and whose rear end 12 constitutes a bayonet coupling engaging the camera housing 14. A rack 3 is integral with the guide member 9, 10 and is normally engaged by a disk 2 having a beveled upper surface formed with a spiral groove 16; the spiral turns of this groove are in mesh with respective teeth of the rack 3.

Disk 2 is mounted on a stem 4 which is so inclined, with reference to a plane perpendicular to axis O, that the generatrices of the rack-engaging portion of its grooved surface are parallel to rod 7 and axis O, i.e., horizontal in the position of the camera illustrated in FIG. 1; stem 4 is received in a bore 6b or handle 6 under upward pressure from a restoring spring 5 which urges the two coupling elements 2, 3 into mutual engagement. Stem 4 lies in a plane including the optical axis O and extends generally radially with reference to that axis.

A milled knob 1 is fixedly secured to the stem 4 and projects forwardly from handle 6 so as to be rotatable by the fingers of the user, thereby imparting vernier adjustment to the objective 15 with reference to a film surface (not shown) in camera housing 14.

For coarse preliminary adjustment, knob 1 is depressed against the force of spring 5 to decouple the disk 2 from the rack 3, whereupon the lens holder 13 may be freely slid back and forth on the tube 11 for rough focusing, e.g., as determined with the aid of a reflex-type view finder (not shown) of conventional design. For exact focusing, knob 1 is allowed to rise into a position of reengagement of elements 2 and 3 whereupon the system may be further adjusted by rotation of the knob as already described. It will be seen that the handle 6 forms abutments for the knob 1 which limit the longitudinal displacement of the stem 4 in its bore.

In principle it would be possible to connect the handle 6 and its support member 7 with either the lens holder 13 or the camera housing 14. The illustrated arrangement, in which the handle is rigid with the lens holder, is deemed preferable, however, because the camera housing is usually of lighter weight than the objective and its holder. If the objective 15 is to be replaced by a lens system of different focal length, suitable adapter rings known per se may have to be used to compensate for the resulting changes in image distance.

Naturally, the system described and illustrated is capable of numerous structural modifications without departing from the spirit and scope of my invention as defined in the appended claims.

I claim:
1. In an optical instrument including a housing and a lens holder movable with reference to said housing along its optical axis, the combination therewith of:
   a pair of interengaging support members relatively slidable along said optical axis, said members being respectively secured to said housing and to said lens holder;

a handle rigid with one of said support members;

a stem rotatably lodged in said handle, said stem extending generally radially in a plane including said optical axis with freedom of longitudinal shifting;

a first coupling element carried on said stem for rotation thereby;

a second coupling element carried on the other of said support members for engagement with said first coupling element to translate rotation of the latter into relative linear displacement of said lens holder with reference to said housing;

spring means in said handle normally maintaining said coupling elements interengaged by urging said stem toward said axis;

and a knob on said stem projecting from said housing for manual rotation and longitudinal shifting against the force of said spring means.

2. The combination defined in claim 1 wherein said first coupling element is a disk having a spirally grooved surface, said second coupling element being a rack normally in mesh with said grooved surface.

3. The combination defined in claim 2 wherein said grooved surface is beveled, said stem being inclined at an angle less than 90° with reference to said optical axis.

4. The combination defined in claim 1 wherein said handle is formed with abutments for said knob limiting the sliding of said stem.

5. The combination defined in claim 1 wherein said one of said support members is rigid with said lens holder.

6. The combination defined in claim 1 wherein said support members include a cylinder and a rod on said handle traversing said cylinder, said rod extending parallel to said optical axis.

7. The combination defined in claim 6, further comprising ball-bearing means interposed between said rod and said cylinder.

References Cited

UNITED STATES PATENTS

| | | | |
|---|---|---|---|
| 1,245,400 | 11/1917 | Tomlinson | 74—424.6 XR |
| 2,920,545 | 1/1960 | Kellner | 95—45 |
| 2,984,167 | 5/1961 | Staubach | 350—255 |

DAVID SCHONBERG, *Primary Examiner.*

MICHAEL J. TOKAR, *Assistant Examiner.*

U.S. Cl. X.R.

95—45